Patented Oct. 21, 1952

2,614,961

UNITED STATES PATENT OFFICE 2,614,961

PROPELLENT INSECTICIDE COMPRISING O-CYCLOHEXYLCYCLOHEXENONE, PYRETHRINS AND PIPERONYL BUTOXIDE

Joseph B. Dickey and Harry W. Coover, Jr., Rochester, N. Y., assignors to Eastman Kodak Company, Rochester, N. Y., a corporation of New Jersey No Drawing. Application September 24, 1949, Serial No. 117,717

2 Claims. (Cl. 167—24)

This invention relates to compositions useful for insecticidal purposes. More specifically the invention is concerned with insecticidal compositions containing o-cyclohexenylcyclohexanone together with a carrier therefor.

Compounds to be of value for insecticidal purposes should ordinarily be light-stable, compatible with light paraffinic mineral oils, free from harmful effects to plants, free of a tendency to stain walls, fabrics, etc., and be not offensive to human beings.

Many of the insecticides which are known at the present time are either short-lived in effectiveness or have other characteristics which prevent those insecticides from being of general application.

One object of our invention is to provide insecticidal compositions which are highly toxic to insects but are of low toxicity to man and other warm-blooded animals. Another object of our invention is to provide insecticidal compositions which are simple to use but are highly effective against the various insects which are of a destructive nature, such as to plant life, foodstuffs, or fabric materials. A further object of our invention is to provide o-cyclohexenylcyclohexanone in a form in which it is useful for combating harmful insect life. Other objects of our invention will appear herein.

We have found that o-cyclohexenylcyclohexanone is a particularly effective and highly active insecticidal material. This compound may be prepared by the manner described in Annalen der Chemie 477,119 (1930) by condensing cyclohexanol with dry HCl under the effect of cooling, and then heating the resulting material in a vacuum to drive off HCl from the compound. By incorporating this compound in a carrier therefor an insecticidal composition is obtained which is effective against the common insect pests, the destruction of which is desirable.

The insecticidal value of o-cyclohexenylcyclohexanone is shown by various tests carried out by contacting insects with this compound. For instance by preparing a dust of o-cyclohexenylcyclohexanone and an inert carrier, such as pyrophyllite, and after placing fruit flies in a bottle, sprinkling with the dust, and observing the flies at intervals, it may be seen that 100% kill of those fruit flies is obtained in a short time. Another method of determining the effectiveness of this compound as an insecticide is to dip a piece of filter paper into a solution of the compound in an organic solvent and allowing the paper to dry, placing the same in a jar containing fruit flies. 100% kill is obtained in but a very short time with o-cyclohexenylcyclohexanone. The insecticidal compositions in accordance with our invention are effective against various other insect pests, such as house flies, silverfish, bean beetles, flea beetles, cucumber beetles, aphids, red spiders and other mites, thrips, etc.

The proportion of cyclohexenylcyclohexanone which is employed in insecticidal compositions in accordance with our invention may be varied over a wide range. For instance, insects having little or no protective covering are readily susceptible to the effect of this compound and, thus, even as little as 0.5% thereof would be effective. Ordinarily, however, a higher percentage of this compound is desirable being most useful in the proportion of 2–10% of cyclohexenylcyclohexanone in the composition. If desired, however, other insecticidal materials may be used as an additive to or to displace part of the cyclohexenylcyclohexanone which is present in the insecticidal composition. For instance, insecticides, such as pyrethrum, rotenone, nicotine, calcium or lead arsenate, paradichlorobenzene or the like may be incorporated in the compositions in accordance with our invention. Also, fungicidal materials such as lime-sulfur, sulfur, Bordeaux mixture, mercury compounds, or the like, may be included in the insecticidal compositions in accordance with our invention. It may often be desired to incorporate synergists in insecticidal compositions in accordance with our invention to enhance the effectiveness of those compositions. Some compounds which themselves do not exhibit insecticidal properties but which increase the effectiveness of the cyclohexenylcyclohexanone are piperonyl butoxide, piperonyl propoxide and piperonyl butyl carbitol oxide. But a small proportion of the synergist need be incorporated in the composition to be effective such as 0.5–2%; however, if desired, up to 5% of the synergist may be added.

We have found that petroleum distillates are particularly effective as solvents in preparing cyclohexenylcyclohexanone insecticidal compositions, such as petroleum hydrocarbons having a boiling range of 80–150° C. For dusting compositions we have found pyrophyllite to be of advantage as a carrier for the cyclohexenylcyclohexanone.

The following examples illustrate compositions in accordance with our invention which are particularly effective for insecticidal purposes:

*Example 1.*—The following composition is particularly effective for use as aerosols in which a propelling liquid is present:

| | Per cent |
|---|---|
| o-Cyclohexenylcyclohexanone | 2–5 |
| Refined petroleum distillate | 12–15 |
| Inert propellant, such as dichlorodifluoromethane or methyl chloride | 85 |

*Example 2.*—The following is an example of an insecticidal composition in which other materials having insecticidal properties are incorporated:

| | Per cent |
|---|---|
| Cyclohexenylcyclohexanone | 2 |
| Pyrethrin extract | 0.2 |
| Piperonyl butoxide | 1.0 |
| Petroleum distillate | 12 |
| Inert propellant | 84.8 |

*Example 3.*—Instead of using a propellant the composition of cyclohexenylcyclohexanone in a petroleum distillate may be emulsified in water by means of an emulsifying agent, such as whale oil soap, ordinary soap, sodium lauryl sulfate or the like.

*Example 4.*—A particularly effective insecticidal dusting compound is obtained by incorporating 5–10% of cyclohexenylcyclohexanone in 90–95% of pyrophyllite in finely divided form.

We claim:

1. An insecticidal composition comprising 2% of o-cyclohexenylcyclohexanone, 0.2% of pyrethrin extract, 1% of piperonyl butoxide, 12% of petroleum distillate and 84.8% of an inert propellant therefor.

2. An insecticidal composition comprising 2% of o-cyclohexenylcyclohexanone, 0.2% of pyrethrin extract, 1% of piperonyl butoxide, 12% of petroleum distillate and 84.8% of dichlorodifluoromethane.

JOSEPH B. DICKEY.
HARRY W. COOVER, Jr.

REFERENCES CITED

The following references are of record in the file of this patent:

UNITED STATES PATENTS

| Number | Name | Date |
|---|---|---|
| 2,454,061 | Hill et al. | Nov. 16, 1948 |
| 2,481,438 | Mowery | Sept. 6, 1949 |
| 2,485,681 | Wachs | Oct. 25, 1949 |

OTHER REFERENCES

Eddy et al., J. Econ. Ent., Volume 39, pages 763 to 767 (1946).

Chem. and Engr. News, Volume 25, Number 40, October 6, 1947, page 2883.